United States Patent
Stanley

[11] 3,725,568
[45] Apr. 3, 1973

[54] ELECTRICAL CEILING RACEWAY
[75] Inventor: John Edwin Stanley, La Canada, Calif.
[73] Assignee: Duo-Flex Corporation, Glendale, Calif.
[22] Filed: Dec. 6, 1971
[21] Appl. No.: 205,244

[52] U.S. Cl............................................174/48, 52/39
[51] Int. Cl. ...................................................H02g 3/04
[58] Field of Search ......174/48, 49, 101, 95; 52/220, 52/221, 28, 39, 495, 656

[56] References Cited

UNITED STATES PATENTS

| | | | |
|---|---|---|---|
| 2,956,150 | 10/1960 | Schwartz | 240/9 |
| 3,275,817 | 9/1966 | Schwartz | 240/9 |
| 3,504,172 | 3/1970 | Liberman | 240/78 |
| 3,001,001 | 9/1961 | Bibb | 174/48 X |
| 2,888,113 | 5/1959 | Schwartz et al. | 174/49 UX |
| 3,146,956 | 9/1964 | Schwartz et al. | 174/49 UX |

Primary Examiner—Bernard A. Gilheany
Assistant Examiner—D. A. Tone
Attorney—William H. Pavitt, Jr. et al.

[57] ABSTRACT

An electrical raceway comprising a housing which, in section, is enclosed on all sides except an opening which extends along the entire length of the housing. The opening may be closed by a removable cover plate after suitable wiring has been laid into the raceway within the housing. The housing may be of any suitable shape and, in fact, may form two separated raceways, each of which is enclosed by a removable cover. Suitable means are provided, replacing predetermined portions of the covers, for mechanically connecting electrical or telephone conduit thereto so that a suitable connection can be made between the cable within the raceway and that in the conduit. Structure, formed integral with the housing, is provided for suspension of the housing from a building ceiling in such a way that the suspension system does not interfere with access to the raceway through the cover plates. Structure for supporting a false ceiling is also formed integral with the housing and extends therefrom for holding false ceiling panels below the housing in a well-known manner.

4 Claims, 6 Drawing Figures

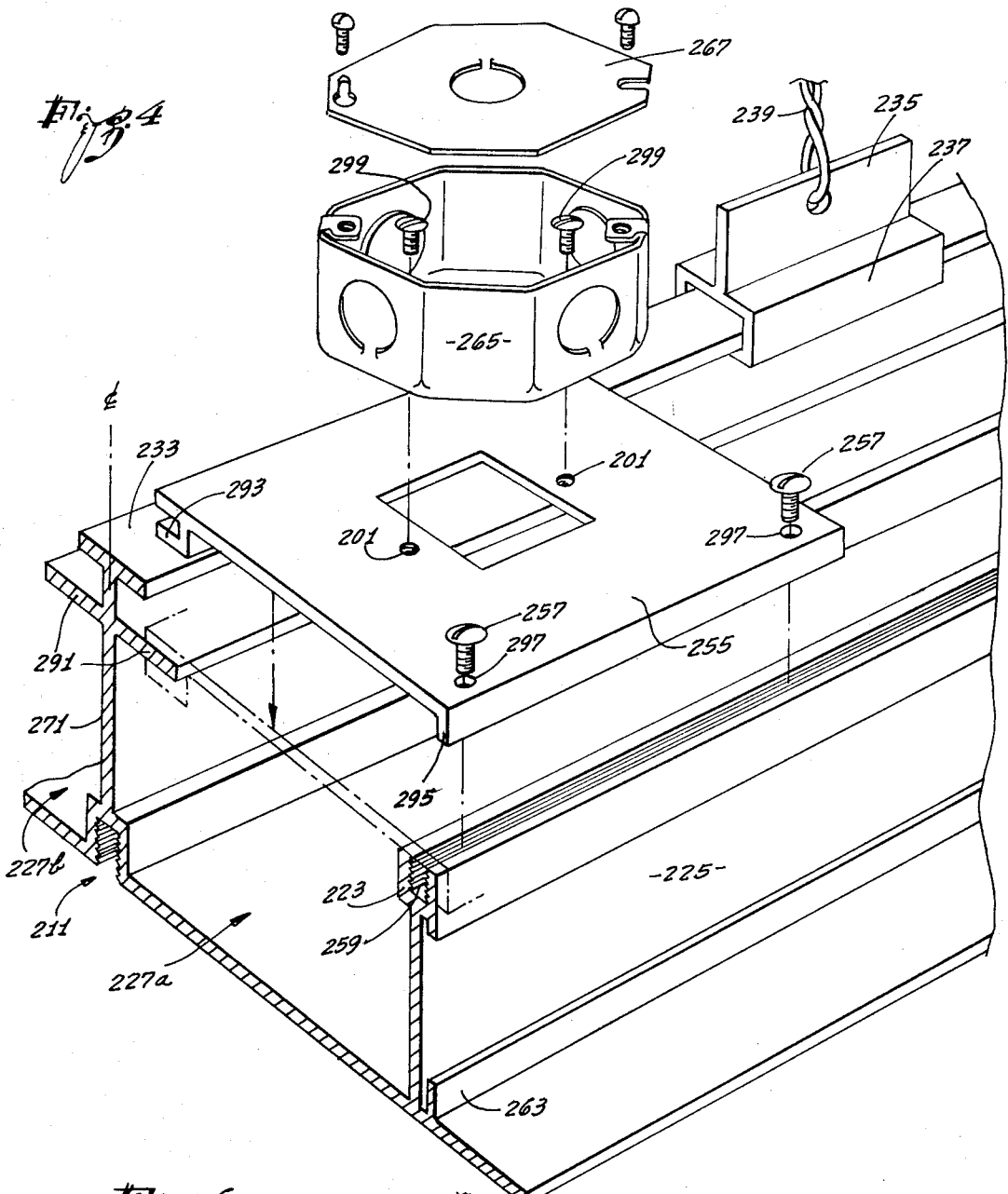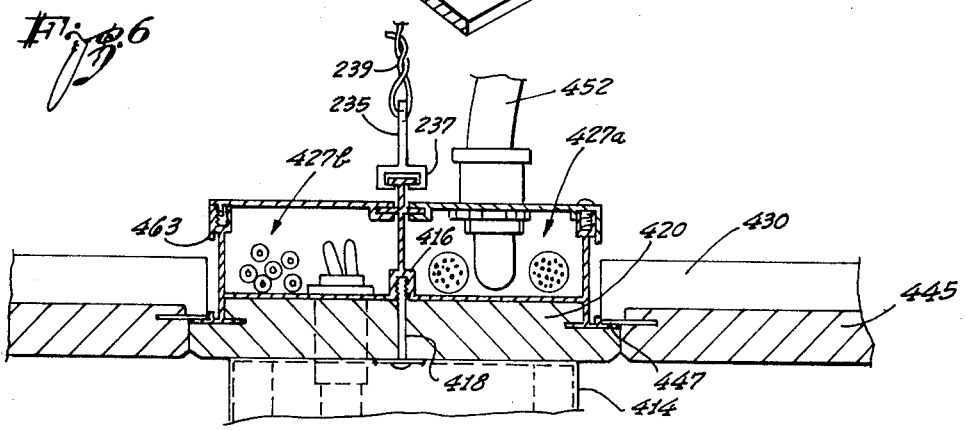

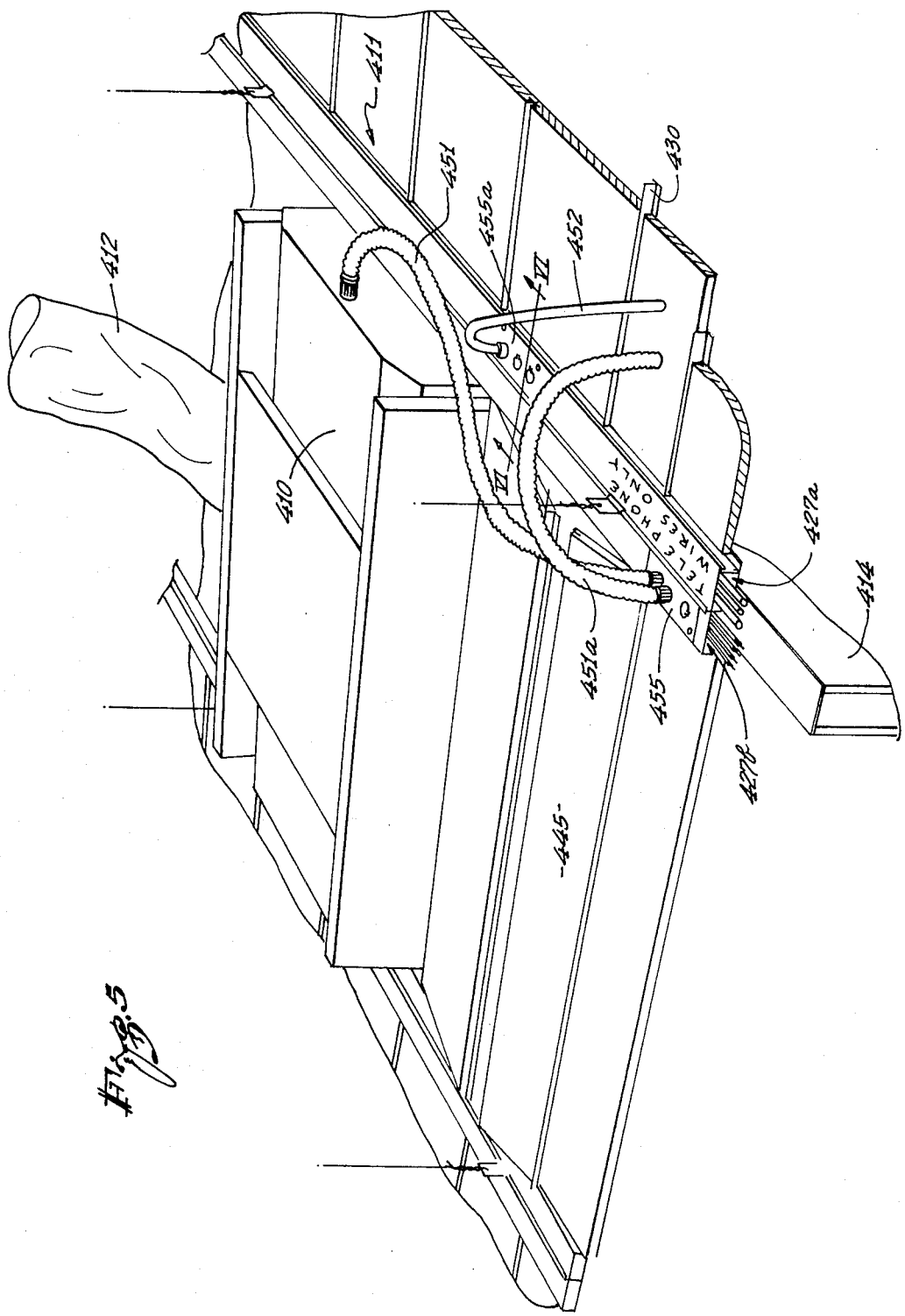

ELECTRICAL CEILING RACEWAY

BACKGROUND OF THE INVENTION

In the construction of modern buildings, an overhead is formed on the undersurface of the next floor above. Immediately below the overhead, various environmental control systems are positioned and a false ceiling is then suspended from the overhead and located below the environmental control systems. Such environmental control systems include air-conditioning and heating ducts, water and sewage lines, electrical and telephone lines, etc.

The present invention relates to apparatus for proper suspension and handling of the electrical and telephone systems. More specifically, the present invention relates to electrical raceways.

When such buildings are constructed with presently available materials, the electrician either uses flexible cable commonly referred to as "B-X" or rigid conduit through which conductors or wires must be threaded and pulled. While the use of these devices is not totally unsatisfactory, it is expensive since the cable or conduit has to be independently suspended from the overhead and the false ceiling also has to be independently suspended therefrom. Further, although the flexible cable is relatively convenient since no wire has to be pulled therethrough, it is usually relatively difficult to cut the cable in order to construct a junction therewith to provide power to an electrical appliance. On the other hand, use of rigid conduit requires the expenditure of a considerable amount of time since the conduit is usually cut and bent right on the job and the wires must then be pulled therethrough individually before further work can be undertaken.

In either case, no provision is made for the suspension and distribution of telephone lines, and, if emergency power systems are required, a duplicate flexible cable or rigid conduit must be properly formed and suspended from the overhead.

More recently, it has been found desirable to create a raceway which can be suspended from the overhead and is provided with structure for supporting the panels of the false ceiling. This concept has been embodied in enclosed raceways in which suitable wiring has been laid during the manufacture of the raceway. A removable cap is formed along the upper surface of the raceway at each end thereof so that when two raceway sections are abutted end-to-end, the caps can be removed and the wires in each raceway properly connected together in order to provide electrical continuity therebetween. The caps are then reinstalled to properly enclose the raceway.

At predetermined locations along the upper surface of those raceway sections, outlets have been provided into which a suitable plug can be inserted. Electrical connection of the plug to an electrical device, such as a fan or light, allows power to be delivered to the latter.

Unfortunately, the plug-outlet system has proven relatively unsatisfactory since the user is required to plug into the nearest outlet on the raceway — which may be inconveniently distant — rather than merely connecting to the closest point on the raceway. Further, in order to prevent the plugs from eventually becoming loosened from the outlets due to normal vibrations within the building, it has become necessary to utilize very expensive special plugs and outlets in order to provide a positive lock therebetween.

These raceways have also presented a disadvantage in that the construction electrician is restricted in the wiring that he has available. The factory-constructed raceways are provided only with a predetermined number of wires, having predetermined colors of insulation thereon. Therefore, in complex wiring systems, an electrician may find that he is required to either string additional wires through flexible or rigid conduit, or to join wires having different colors of insulation thereon. The latter course of action obviously creates a possibility of confusion both during construction and later modification and/or repair of the system. Further, the construction electrician is required to mechanically join the corresponding sets of wires in abutting raceways. This is rather time consuming — and thus expensive and is impractical since there is always a possibility that a wiring junction can become separated or, through error at the time of construction, never joined at all. Danger of fire may then exist or, at least, much time will be expended in locating the trouble.

The prior art raceway systems make no provision for emergency or telephone circuits, thereby generating additional, but unnecessary work and expense. Further, since the outlets are provided along the upper surface of the raceway, structure provided for suspending the raceway from the overhead can restrict access to the raceway at a later time. For example, in one commonly available raceway of this type, apertures are provided in the false panel suspension flange which is formed integral with the raceway. The suspension wires are passed through those apertures and are then wound upon themselves. The free end is passed over a suspension device on the overhead and wound upon itself again. In other words, the wire must pass about the raceway and is wound upon itself immediately above the upper surface of the raceway. In some instances, it is possible that this suspension system may block access to some of the outlets in the raceway but, in every instance, it will reduce the possibility of gaining access to the raceway in case of any damage which might possibly occur thereto. If, for example, a wire attached to one of the outlets should become loosened over a period of time as a result of building vibration, it could become necessary to detach the false ceiling suspension wires from the raceway in order to gain access thereto to repair the wire. This, of course, assumes that the outlet is adjacent one of the removable caps of the raceway since the remainder of the upper surface of the raceway is not openable for access.

Also in the prior art, false panel supports have been used to extend perpendicularly to the raceway to allow four-sided support of the panels. The raceway panel supports have been provided with slots which receive the ends of the perpendicular supports. Although this is not totally unsatisfactory, it is sometimes difficult to install the perpendicular supports near the edges of rooms since there is no play in the raceway suspension above the partitions to allow the perpendicular supports to be slipped into the slots.

Therefore, the prior art devices have proven to be very expensive and are not subject to fast construction and easy repair because they are either preconstructed at a factory — in the case of raceways — or must have wires threaded and then pulled therethrough — in the case of conduit. Additionally, the prior art devices are not subject to easy access for repair and connection of additional electrical structures thereto and they make no provision of either telephone circuits or emergency power circuits, thereby requiring that these circuits be provided with separate suspension and/or raceways.

SUMMARY OF THE INVENTION

The present invention relates to an improved raceway system which may be utilized to provide speed, convenience, and economy in constructing modern buildings. More specifically, the invention relates to a raceway which may be quickly and simply suspended from an overhead and then utilized to support the panels of a false ceiling.

In accordance with the present invention, a raceway is formed within a housing which forms a portion of the structure suspended form the overhead and supporting the false ceiling. The housing may be formed with any desired configuration in cross section, such as a square, rectangle, triangle, or any other desired shape. In each such configuration, however, all of the periphery, taken in cross section, except one portion thereof is formed integral with the housing and suspension structure. The portion which is not enclosed by integral structure may be closed by means of removable plate which allows quick and easy access to the interior of the housing or raceway. In other words, the periphery of the raceway may be of any suitable configuration and completely closed when a removable cover is positioned thereon.

The raceway may be supported by structure integral with and above the housing, but which is sufficiently distant from the location of the removable cover so that it does not interfere with the installation or removal of the cover. This feature is deemed significant since the cover can be removed along the entire length of the raceway without obstruction and wires can be laid in the raceway without having to thread them through the suspension cables.

In use, the open raceway housing is suspended from the overhead at proper positions for later support of the false panels. If desired, cross panel-support members may be installed perpendicular to the raceways at certain predetermined locations so that the false panels will be supported on all four sides thereof.

When the housings have been suitably suspended, the construction electrician may then put various wires into the raceway merely by laying them into the open housing. In other words, he is not required to thread or pull the wires through the housing and he is not restricted to the use of wires installed in the housing at the factory. As a result, it is as easy for the electrician to lay wires into a raceway as it would be for him to lay them along a certain path on a floor. Additionally, he can use wire with any desired insulation color so that, by following suitable architectural engineering drawings, the wiring color usage will be uniform throughout the building. This feature allows an electrician working with a wire having red insulation, for example, on the first floor to be certain that he is working with the same wire in the same type of circuit, if not the same circuit, when has red insulation on the top or any other floor. As a further important feature, use of the invention significantly reduces the number of mechanical junctions in each circuit since a wire will not ordinarily be broken at any point along its length except junction boxes. In other words, in clear distinction to prior art devices, there is no need for connecting wires to one another at the ends of each and every end-for-end abutted raceway section.

Thus, as will now be clearly understood, the installation of the raceway per se and the wiring therein, is a relatively fast and easy operation. When it has been accomplished, the electrician may enclose the raceway completely by positioning an easily installed cover plate over the open portion of the housing.

It will be understood, of course, that the electrician will be required to make various connection with the wiring installed in the raceway at predetermined positions to provide suitable power to various devices such as lights, fan motors, etc. In order to accomplish this, structure-in the form of junction plates and junction box mounting plates-is provided which will allow the shield of a flexible cable or a rigid conduit, to be mechanically attached to the housing in a manner similar to that by which flexible cable or conduit would be attached to a junction box. Of course, this is done in order to relieve any possible tension which might be transmitted to the junction of the wires in the flexible cable and the wires in the raceway.

Thus, by (1) suitably electrically and mechanically attaching a flexible cable, for example, to a device to receive power, (2) suitably mechanically attaching the flexible cable shield to the junction plate, and the wires within the shield to the wires in the raceway, and (3) installing the junction plate over the open portion of the housing, the electrician can quickly and easily provide power to any desired electrical fixture.

Upon completion of the electrical and other environmental control system installations, the false panels can be installed and the ceiling is then complete. Since a single suspension system is utilized to support both the electrical raceway and the false panels, the panel suspension system will in no way interfere with later access to the interior of the raceway for installation of new wiring, connection of new electrical appliances, etc.

In one alternate embodiment of the invention, the housing is formed into two separate and distinct raceways. Such a feature may be desirable, for example, when one raceway is to be used for standard circuit electrical power and the other is to be used for standard circuit electrical power and the other is to be used for the emergency circuit. Since the wires are placed in two different raceways, it will be impossible for an electrician to inadvertently connect appliances to the wrong circuit if he enters the correct raceway. Alternatively, one raceway could be used for electrical wires and the other raceway could be utilized for telephone wiring. It will be realized that three or more raceways could be provided within the one housing, if desired.

The connection plate may be provided with suitable structure to which a junction box is rigidly fastened, if desired, in order to allow the wires to be connected within the junction box rather than within the raceway.

In another embodiment, the raceway may be provided with structure to which partitions can be attached.

The false panel supports which extend perpendicular to the raceways may be manufactured so as to rest upon the upper surface of the panel support of the housing, rather than in slots therein. Formation of the support structure in accordance with this embodiment allows panel to be quickly and easily removed without disturbing the raceways and without requiring disengagement of the perpendicular supports from slots in the housing. This is particularly advantageous in the case of a raceway located above a room partition, since the raceway may be fixed to the partition, but no "play" or looseness is required for mounting the perpendicular supports.

Therefore, the utilization of raceways formed in accordance with the present invention allows a rapid and easy installation of the raceway in new construction and allows rapid access to the raceway for repair or remodeling without requiring the use of tools for such access. As a result of the use of a single suspension system for the false ceiling panels and the raceways, the installation of both is faster and less expensive and the suspension structure will not hinder the electrician when he lays the wires into the raceway, when he attaches electrically powered devices to the wires in the raceway, or when he installs or removes the cover for the raceway opening.

Other objects, advantages, modes and embodiments of this invention will be readily understood by those skilled in the art upon review of the accompanying drawings, taken together with the following detailed description which illustrate and describe what are presently considered to be preferred embodiments of the best mode contemplated for utilizing the novel principles of the invention which is defined in the claims appended hereto.

BRIEF DESCRIPTION OF THE DRAWINGS

FIG. 3 comprises a perspective illustration of an alternate embodiment of the present invention, showing the use of a single housing having two distinct raceways therein;

FIG. 4 comprises a perspective illustration of a third embodiment of a raceway formed in accordance with the present invention;

FIG. 5 is a top perspective view of a false ceiling in which the present invention is utilized; and FIG. 6 comprises a sectional view of a single housing — dual raceway embodiment of the present invention, as seen along a line VI—VI of FIG. 5.

DETAILED DESCRIPTION

Figure 1:
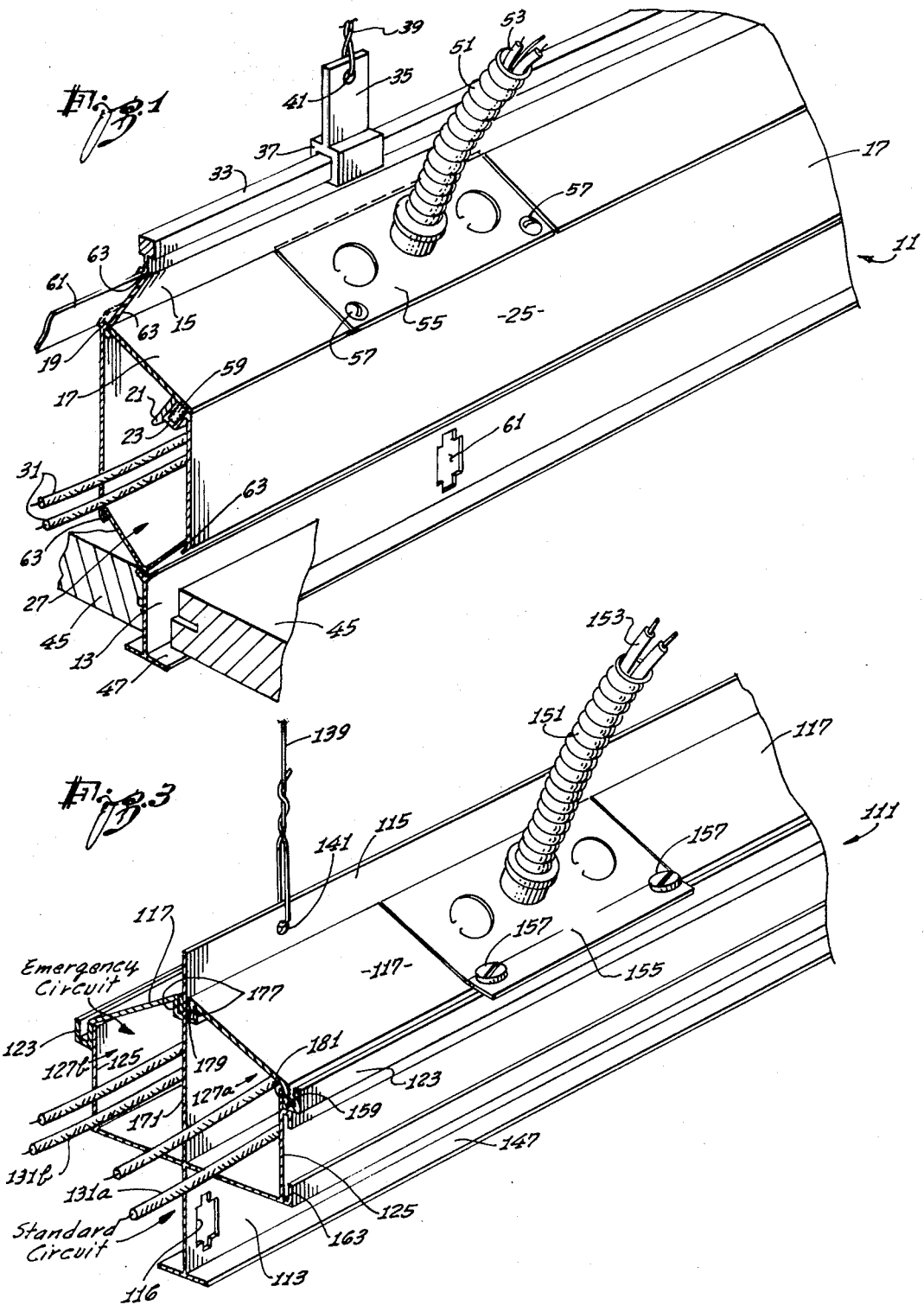
FIG. 1 comprises a perspective illustration of one embodiment of a raceway formed in accordance with the present invention.

Referring now to FIG. 1, there is shown a housing generally illustrated at 11 having a lower web 13 and an upper web 15 extending therefrom for purposes to be described later. The housing 11 is illustrated as having five sides, four of which are integral with the housing. The fifth side comprises a removable plate 17 which extends into a slot 19 and has a locking tab at 21 at the opposite end thereof. Tab 21 cooperates with a shoulder 23 located at the end of an integral wall 25 of the housing. When the plate 17 is pushed into the slot 19 which extends along the length of the housing, the locking tab, which is slightly flexible, in the manner of a leaf spring, can be pushed down below the shoulder 23 to hold the plate in position. When it is desired to move the plate, it is only necessary for a workman to insert an object such as a screwdriver between the plate and the upper surface of the shoulder, forcing the cover upwardly until the tab 21 is pulled up over the shoulder 23. Thus, a raceway 27 enclosed within the housing 11 may be exposed when desired, by removal of the cover plate 17 but may be completely closed when the plate is installed in the manner shown and described. Except as described below, the cover plate covers the entire length of the opening in the housing.

Although the raceway has been illustrated in this embodiment as being enclosed by a five-sided housing, it is important to realize that the housing could be manufactured in any convenient shape, whether polygonal, circular, or whatever. It is, however, important that a portion of the cross sectional periphery of the housing be removable, as is the plate 17, for access to the raceway along the entire length thereof. When the cover plate 17 is removed, an electrician can lay wires 31 along the length of the raceway 27 without being impeded in any way. Thus, the construction of the raceway is quick and simple.

The upper web 15, which may extend from any suitable portion of the housing 11, is provided with an enlarged shoulder element 33 at the upper end thereof. Shoulder 33 is preferably situated on the web 15 in such a manner as to directly above the center of gravity of the housing, thereby allowing the housing to hang in a vertically plane. A plurality of hangers 35, having a C-shaped enlargement 37 on the bottom portion thereof are attached to the shoulder 33 by passing the C-shaped structure over the end of the shoulder. The shoulder becomes completely captured within the structure 37. By this means, the hanger 35 can be moved along the shoulder 33 to any desired position relative to an overhead (not shown) from which wires 39 are hung. The wires 39 may then be passed through apertures 41 in the hanger and, when properly wound upon themselves, will act, through the hanger, to suspend the housing 11 from the overhead.

From the lower portion of the housing 11, a T-shaped web 13 extends below the housing in a vertical plane which passes through the center of gravity of the housing. As illustrated, a plurality of false panels 45 may be supported by the cross member 47 of the T-shaped web. Thus, the false panels 45 are supported by the raceways, as well as by other standard T-bars, thereby requiring only a single suspension system for supporting the raceway housing and the false panels at the locations along which the housing extends.

In use, the hangers 35 are pushed along the shoulder 33 until they are properly positioned relative to wires 39 which are hung from the overhead. The electrician then passes the wires 39 through the apertures 41 in the hangers, positions the housing 11 relative to the floor below, and wraps the wire 39 about itself to produce proper support for the housing. The electrician then lays suitable wires 31 along the raceway 27. It will be realized, of course, that any desired number of wires can be laid in the raceway and the wires used can be provided with any desired insulation coloring which, by proper coding, will allow the use of a standard and consistent color code throughout the electrical systems of the building being constructed.

Whenever it is desired to connect an electrical fixture (not shown) to the wires 31 in the raceway, a conduit 51 having wiring 53 therein is mechanically attached to a junction plate 55 by any of several well-known means. The wires 53 may then be suitably joined to the wires 31 by means of wire nuts or any other suitable electrical junction apparatus. One edge of the junction plate 55 is pushed into the slot 19 and a pair of bolts 57 may be threaded into a slot 59 in the shoulder 23; slot 59 may be provided with threading on the internal surfaces thereof for The electrician may then install at cover plate or plates over the remainder of the open portion of the housing periphery, thereby completely enclosing the raceway to prevent inadvertent access to the wiring therein.

Suitable T-bars (not shown) may, where necessary, be attached to the web 13 at various apertures 61 therein by fastening the T-bars to the apertures 61 in a well-known manner. When this has been completed, false panels 45 can be placed onto the cross member 47 of the lower web 13 so as to be supported thereby along the length of the housing.

Thus, the electrical raceway and the false panels are quickly and easily suspended from the overhead by a single suspension system. Since the suspension system does not obstruct access to the raceway 27, due to its removed position relative to the cover plate 17, it is a very simple matter for the electrician to install the wiring in the raceway as well as to gain access thereto at a later time for connection of additional appliances to the wiring therein.

If it is necessary to place two such housings in end-to-end abutment, the housings can be maintained in proper relationship to one another by means of a plurality of splice plates 61 which may be installed within suitable slots 63 located on the external surface of the housing at a plurality of positions. The splice plates, which may be only a few inches long, can be located completely within the slots of one housing at the time that two housings are placed in end-to-end abutment. The splice plates 61 may then be slid along the slots 63 in one of the housings so as to extend into the abutted slot of the adjacent housing, thereby preventing each housing from moving relative to the axis of the next. Thus, the wires 31 passing through the raceways are prevented from being severed or shorted out by relative movement between the housings.

It will be recognized, of course, that the electrician may, if desired, also utilize the cover plate 17 by extending it to cover portions of the openings in abutted housings, thereby increasing rigidity between the housings. Since the housings are suspended from the overhead and eventually become attached to other housings or electrical connection devices which are rigidly connected to partitions and building walls, relative movement between the housings along the axis thereof is impossible. However, if it is desired to prevent such axial movement during construction, adjacent housings may be mechanically coupled to one another by suitable means which are presently commercially available and act through apertures (not shown) at the ends of the webs 13. In any event, with the illustrated structure, structural rigidity between abutting housings 11 is ensured, thereby increasing the integrity of the electrical distribution system.

It should not be clear that, contrary to the prior art requirements, the wiring 31 is laid in the continuous opening thus formed by abutted housing and need not be spliced at each abutment. This, of course, reduces construction time and also reduces later repairs since splices can open under some adverse circumstances.

Figure 2:
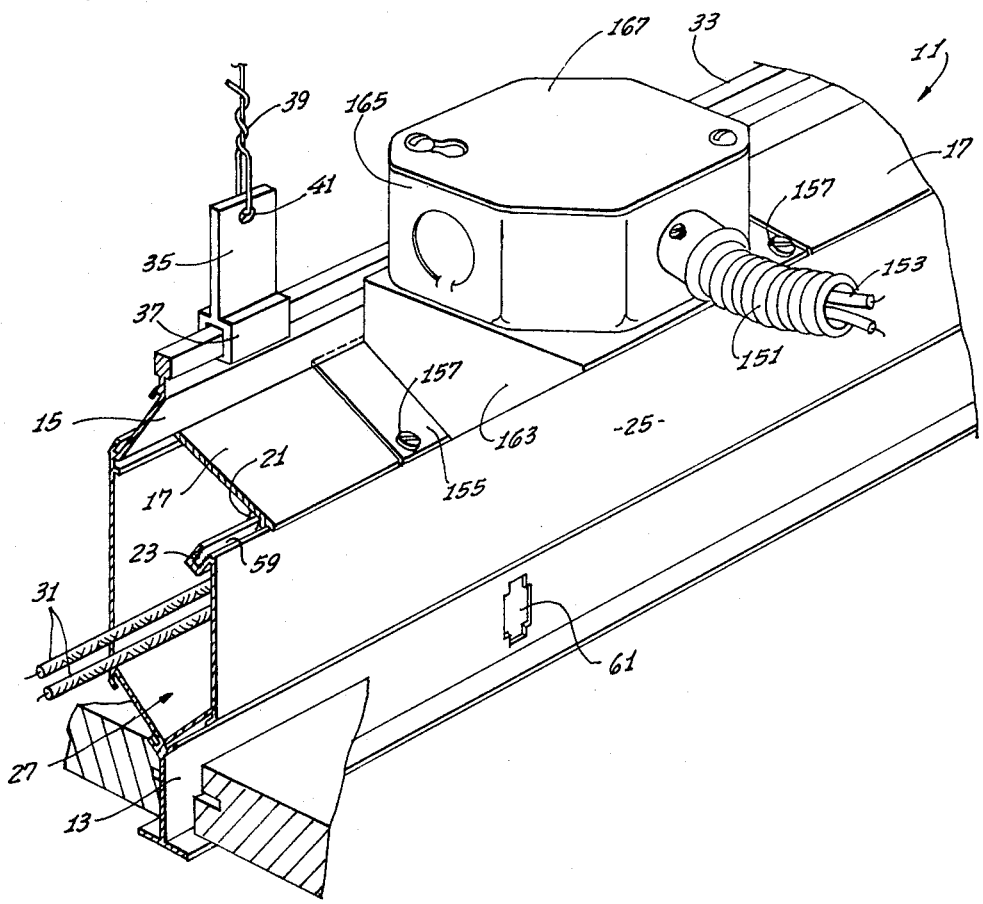
FIG. 2 comprises a view similar to FIG. 1, illustrating alternate structure for connecting the wires in the raceway to those leading to an electrically powered device.

In some cases, it is desirable or necessary to form the junction between the wires in the raceway and wires leading to appliances on the outside of the raceway housing so that the wire nuts, etc., are not in the raceway and do not interfere with the installation of future wiring therein. As shown in FIG. 2, this can be accomplished by providing a junction plate 155 which may be attached to the housing by bolts 157 in a manner similar to that described relative to the structure in FIG. 1. A junction housing 163 may be formed integral with the plate 155 or rigidly attached thereto. In either event, the junction housing 163 encloses a volume to which access can be gained only from an opening (not shown) in the plate 155 or an opening (not shown) in the upper surface of the housing 163 which is covered by a junction box 165. The junction box 165 may be rigidly attached to the housing 163, such as by bolts or by welding, and a flexible or rigid conduit 151, having wiring 153 therein, may be mechanically attached thereto by well-known means. The wiring 153 may then be electrically connected to the wires 31 in a raceway 27 by pulling wires 31 up through the junction housing 163 and into the junction box 165. When the wires have been properly joined, a cover plate 167 may be properly fastened to the upper surface of the junction box 165 to enclose the junction.

With this structure, it is possible for an electrician to gain easy access to the junction of the appliance and raceway wiring and that junction is prevented from coming into contact with other wiring on the interior of the raceway. At the same time, access to the junction can be obtained merely by opening the cover plate 167 on the junction box 165 to make any necessary additional connections, modifications, repairs, etc.

Referring now to FIG. 3, a second embodiment of the present invention has been illustrated and elements which are substantially identical to those described in the embodiment shown in FIGS. 1 and 2 have been identified with the same numeral, preceded by the numeral 1. Therefore, no further description thereof will be set forth here.

Reference to the FIG. 3 will clearly indicate that the housing 111 may be provided with a central portion 171 which serves to divide the interior of the housing into two distinct raceways 127a and 127b. As shown in the drawing, the raceway 127a contains wires 131a which may be used to comprise a standard electrical circuit. The raceway 127b may be provided with wires 131b which may serve as an emergency circuit. By this means, two distinct electrical raceways, which are provided within a single housing, are separated from one another so that it will be impossible for an electrician to connect an electrical appliance to the incorrect circuit, so long as he enters the correct raceway. Thus, if desired, identical or nearly identical wiring insulation colors can be used in the two circuits to provide standard and emergency power to various appliances.

A shoulder 123 is formed to the exterior surface of each side wall 125 of the housing. Junction plates 155 may cooperate with the shoulders in substantially the same manner as described relative to the embodiments of FIGS. 1 and 2. At the inner edges of the access openings, a centrally located shoulder-formed slot 177 is provided within each raceway along the central divider 171 to receive and hold a flange 179 which extends along the inner surface of the cover plates 117. A similar flange on the inner edge of junction plate 155 may also be used to cooperate with the slot 177 in a similar manner. A flange 181 on the outer surface of the cover plate fits into the slot 159 of each shoulder 123. Thus, the flanges 179 and 181, cooperating with the slots 177 and 159 serve to hold the cover plates in position and allow them to be easily removed when necessary; a flange on the inner edge of the junction plate which fits into slot 177 and screws 157 which cooperate with slot 159 produce the same result.

A raceway of this type may be suspended from the overhead in the same manner as shown in the embodiments of FIG. 1 or, alternatively, the web 115 may be provided with suitable apertures 141 at predetermined locations and the suspension wires 139 may be threaded therethrough and wound upon themselves to properly support the raceway and the false panels which rest upon the lower web portions 147.

Thus it can be seen, that a raceway housing formed in accordance with the present invention can be provided with a plurality of raceways therein, of any desired and predetermined number, each of which may be closed by an easily removable cover plate to allow quick access to the interior thereof. Further, junction plates or junction boxes of various designs may be used with each of the raceways so long as the junction plates, i.e., 115, are provided with suitable flanges, etc., to cooperate with the cover plate holding shoulders, slots, etc. Of course, if desired, it would be possible to close the openings of both raceways with a single cover.

A third embodiment of the present invention has been illustrated in FIG. 4 for the purpose of showing a different configuration which may be utilized to obtain the desired results. Elements shown in this embodiment which perform substantially the same results in the same way as those illustrated in the drawings of the earlier embodiments have been provided wiTh identical identification numerals, preceded by the numeral 2. Therefore, additional description thereof is unnecessary. Although only one-half of a housing 211 is show, it will be realized that the structure surrounding the second raceway 227b is substantially identical to that shown for 227a.

In this embodiment, the central divider 271 is provided with a pair of perpendicular flanges 291 slightly below the shoulder section 233 at the upper end thereof. An L-shaped flange 293 on the inner edge of the junction plate 255 is formed so as to fit over the flange 291. An outer flange 295 on the plate extends over the outside of a shoulder 223 on the wall 225, in the manner illustrated in phantom in the drawing. A pair of bolts are then passed through apertures 297 in the plate 255 and cooperate with the threaded edges of the groove 259 in the shoulder 223 to hold the junction plate in position relative thereto. A junction box 265, having a cover plate 267, may be fastened to the junction plate 255 by any suitable means such as by welding or by bolts 299 which may cooperate with threaded apertures 201 in the junction plate.

Although not illustrated in the drawing, the removable cover plate which may be utilized with this configuration may be formed with an L-shaped flange similar to the flange 293 on the junction plat 255 and may be provided with an outer flange which fits into the slot 259 or it may be provided with a gripping tab such as that shown at 21 in FIG. 1. In either case, the removable cover plate may be quickly removed from the housing. It will be realized that this configuration also allows quick access to the raceways without being hindered by the suspension system. Further, the false panel supports 247 which are formed integral with the floor of the housing, and are also coplanar therewith, allow a unit such as this to provide a broad ban between adjacent false panels when such an effect is desired by the building architect or interior designer. Comparison of this configuration with the earlier-described embodiments will clearly illustrate that the width of the raceway structure which is visible to a person standing below the false ceiling is significantly larger. However, this feature in no way eliminates any of the advantages of the invention since access to the raceways is just as convenient and the steps required for the basis construction of the electrical system are identical to those used for the prior configuration.

As shown in FIG. 5, an electrical appliance, such as a fan 410, having a flexible exhaust duct 412 connected thereto is properly suspended from an overhead or is supported by the false ceiling T-bar structure, as desired.

A flexible cable 451 which is connected to the electrical appliance 410 is mechanically attached to a junction plate 455 in the housing 411 which covers a portion of raceway 427b. A second flexible cable 451a is also connected to the junction plate and extends to a different appliance or, for example, to a switch located in another portion of the building.

In the raceway 427a, telephone wires are laid; that raceway may also be provided with a similar junction plate 455a. A telephone cable 452 may be connected to the plate 455a so that the wires within the telephone cable may be suitably connected to the wires extending through the raceway.

As shown in the drawing, the housing 411 is mounted so as to be located over the upper edge of a room partition 314. Referring now to FIG. 6, which illustrates a portion of the raceway as taken along a line VI-VI of FIG. 5, it is seen that the lower surface of the raceway may be provided with a threaded slot 416 into which a bolt 418 may be turned so as to fasten the housing 411 to a partial false panel 420 and to the upper portion of the partition 414, is desired. The remainder of the housing may be formed substantially identical to that described in any of the previous embodiments. However, the false panel support flanges 447 are located slightly below the floor of the raceways so that the perpendicular T-bars 430, which may be formed so as to extend into an edge of the false panel, as shown, are supported on the flanges 447 in the manner illustrated. Thus, since the perpendicular T-bars are not locked to the housing, such as by the slot 61 as shown in FIG. 1, an electrician attempting to service the raceway at the later date will not be hindered in gaining access thereto since the panels can be quickly and easily raised as illustrated in FIG. 5. Regardless of the specific embodiment elected, whether one of those described above or another which will now become apparent to those skilled in the art, the features embodied in the present invention produce a significant advancement in the art of electrical power distribution systems utilized in construction and modernization of buildings. A single suspension system is utilized to hang the raceways and suspend the false ceiling panels from the overhead, and that suspension system does not interfere with access to the raceways at any time. Since the raceways can be rigidly attached to one another in end-to-end abutment, and since the wiring is laid into the raceways after suspension thereof from the overhead, it will be unnecessary for an electrician to construct a large number of junctions between wires in the raceways. Instead, he will merely lay wires in the raceways, cutting them only at necessary places such as junction boxes, etc. If trouble should later develop in the circuitry, a significant reduction in the time and effort which must be expended to locate the trouble is therefore provided by the invention.

A housing formed in accordance with this invention may be provided with any desired number of raceways therein which may be used for electrical, telephone, and/or emergency circuitry. The structure which is provided for the support of the false ceiling panels may also be provided with decorative finishes having widths which may be selected by designers at the time that the plans are being drawn up for construction or modernization.

Many modifications and alterations of such structures will now become apparent to those skilled in the art, but they will not, per se, exceed the scope of the invention except insofar as that scope is limited by the following claims.

I claim:

1. A ceiling panel support and raceway member for suspension from an overhead ceiling by means of a plurality of elements extending downwardly from the overhead ceiling, said member comprising:
   a. a rigid elongated, narrow upper transverse support member, said member having means to be secured to the lower extremities of said downwardly extending elements;
   b. an elongated housing attached along the lower portion of said transverse support member to be supported thereby, said housing having bottom and side walls defining at least one raceway to receive and support electrical wiring, said housing further including a removable cover plate, upon removal of which access may be had to the inside of said housing in order to lay, remove or splice such wiring; and
   c. laterally flanged ceiling panel support means carried by the bottom wall of said housing,
   whereby said ceiling panel support and raceway member may serve as a primary support member in a suspended ceiling system, while simultaneously being adapted as a raceway accessably to carry electrical wiring.

2. The ceiling panel support and raceway member as defined in claim 1, wherein said elongated transverse support member is integrally formed with one of said side walls of said housing which partially defines a raceway.

3. The ceiling panel support and raceway member as defined in claim 1, wherein the removable cover plate is formed of a plurality of separate segments, at least one of which is orificed and fitted to receive and grip an end of a B-X cable.

4. The ceiling panel support and raceway member as defined in claim 1, wherein the removable cover plate is orificed and includes as a fitting to be secured about the orifice an electrical cable junction box.

* * * * *